US012325462B1

(12) United States Patent
Deutschmann et al.

(10) Patent No.: US 12,325,462 B1
(45) Date of Patent: Jun. 10, 2025

(54) STEERING WHEEL END CAPS AND ASSOCIATED APPLICATION STRUCTURES

(71) Applicant: Toyoda Gosei Co., Ltd., Kiyosu (JP)

(72) Inventors: Roy Deutschmann, South Lyon, MI (US); Steven Zofchak, Fenton, MI (US); Jonathan Kibat, Brownstown Township, MI (US); Natalia Talkat, Waterford Twp, MI (US); Eunas Gessling, Cape Girardeau, MO (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 0 days.

(21) Appl. No.: 18/519,232

(22) Filed: Nov. 27, 2023

(51) Int. Cl.
*B62D 1/04* (2006.01)

(52) U.S. Cl.
CPC .................................... *B62D 1/04* (2013.01)

(58) Field of Classification Search
None
See application file for complete search history.

(56) References Cited

U.S. PATENT DOCUMENTS

| 6,624,365 | B2 * | 9/2003 | Miyako | B62D 1/04 200/61.57 |
| 10,532,659 | B2 | 1/2020 | Lisseman | |
| 2006/0236807 | A1 * | 10/2006 | Yasuda | B62D 1/06 74/552 |
| 2015/0061264 | A1 * | 3/2015 | Pohanka | B62D 1/06 280/728.2 |

FOREIGN PATENT DOCUMENTS

WO    WO-2013150348 A1 * 10/2013  ............... B62D 1/04

* cited by examiner

*Primary Examiner* — Vicky A Johnson
(74) *Attorney, Agent, or Firm* — Christopher G. Darrow; Darrow Mustafa PC

(57) ABSTRACT

A steering wheel for a vehicle includes an armature and a cap structured to be attached to the armature. The cap includes at least one projection structured to contact a portion of the armature when the cap is applied to the armature. The contact between the projection(s) and the armature is structured to form associated retentive contact interface(s) between the projection(s) and the armature. Each retentive contact interface operates to prevent or impede removal of the cap from the armature, thereby retaining the cap on the steering wheel under normal end-use conditions of the steering wheel.

13 Claims, 7 Drawing Sheets

STEERING WHEEL END CAPS AND ASSOCIATED APPLICATION STRUCTURES

FIELD

The subject matter described herein relates in general to steering wheels and, more particularly, to an end cap structured for application to a portion of a steering wheel.

BACKGROUND

A vehicle may employ a steering wheel including one or more free ends. For both functional and cosmetic reasons, it may be desirable to apply an end cap to each of the steering wheel free ends. It is desirable to attach the cap to the steering wheel free end using a method or mechanism that will not degrade or fail over time and that will ensure retention of the cap under all normal end-use conditions of the steering wheel.

SUMMARY

In one aspect, the present disclosure is directed to a steering wheel for a vehicle. The steering wheel includes an armature and a cap structured to be attached to the armature. The cap includes at least one projection structured to contact a portion of the armature when the cap is applied to the armature.

DETAILED DESCRIPTION

Figure 1:
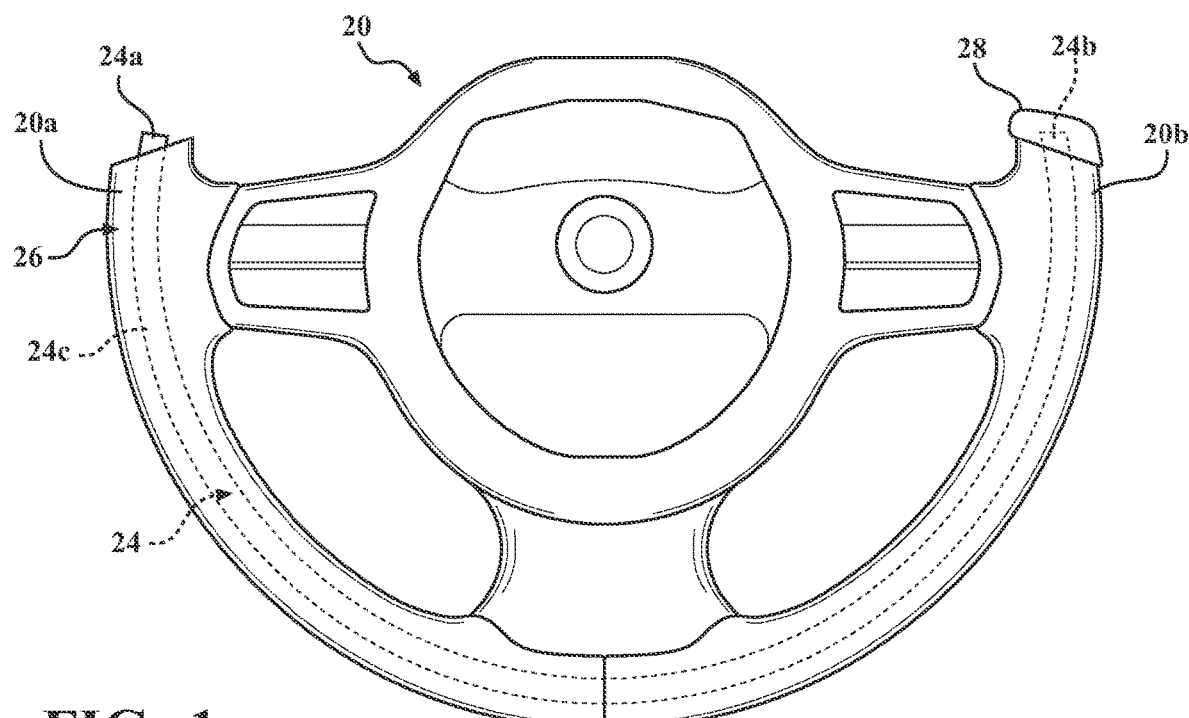
FIG. 1 is a schematic plan view of a steering wheel in accordance with embodiments described herein.

A steering wheel for a vehicle includes an armature and a cap structured to be attached to the armature. The cap includes at least one projection structured to contact a portion of the armature when the cap is applied to the armature. The contact between the projection(s) and the armature is structured to form associated retentive contact interface(s) between the projection(s) and the armature. Each retentive contact interface operates to prevent or impede removal of the cap from the armature, thereby retaining the cap on the steering wheel under normal end-use conditions of the steering wheel.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-9B, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is a schematic plan view of a steering wheel 20 in accordance with embodiments described herein. In particular arrangements, the steering wheel 20 wheel has a pair of free ends 20a, 20b extending from (and unconnected to) other portions of the steering wheel 20. A "free end" of the steering wheel may be a portion of the steering wheel that is suitable for attachment of an end cap thereto, as described herein. Embodiments of the steering wheel described herein will include at least one free end formed therealong.

Referring to FIG. 1, the steering wheel 20 may include an armature 24. The armature 24 may be a structure forming a base to which other portions of the steering wheel 20 may be attached for assembly. In one or more arrangements, the armature 24 may be formed from a metallic casting, such as a magnesium or aluminum casting. In other arrangements, the armature 24 may be polymeric or formed from any other suitable material or materials. In embodiments described herein, the armature 24 may include a body 24c having a first end 24a and a second end 24b opposite the first end. Each of the first and second ends 24a, 24b may be structured for attachment of an end cap thereto, as described herein.

A covering (generally designated 26) may be applied over at least a portion of the armature 24. The covering may be a multi-layer covering as described herein. The steering wheel may also include at least one cap 28 structured to be attached to an end of the armature 24. For purposes of illustration, FIG. 1 shows an example of a cap 28 applied to armature end 24b while armature end 24a is shown without a cap applied. In most arrangements, the steering wheel 20 may have a cap applied to each of armature ends 24a, 24b.

Each version of the cap described herein may include at least one projection structured to contact a portion of the armature when the cap is applied to the armature, so as to provide a retentive contact interface between the projection(s) and the armature. In particular arrangements, the cap may include a plurality of projections, with each projection being structured to contact the armature to provide an associated retentive contact interface therebetween when the cap is applied to the armature. The retentive contact interface(s) may be defined and formed by portions of the armature and the cap projection(s) that are in direct physical contact with each other when the cap is applied to the armature and resides in a final or end-use position on the armature as described herein. Portions of the cap projection(s) and armature forming the retentive contact interfaces described herein may be complementarily structured to attach or secure the cap to the armature when the cap is applied to the armature. Each retentive contact interface operates to prevent or impede removal of the cap from the armature.

Figure 2:
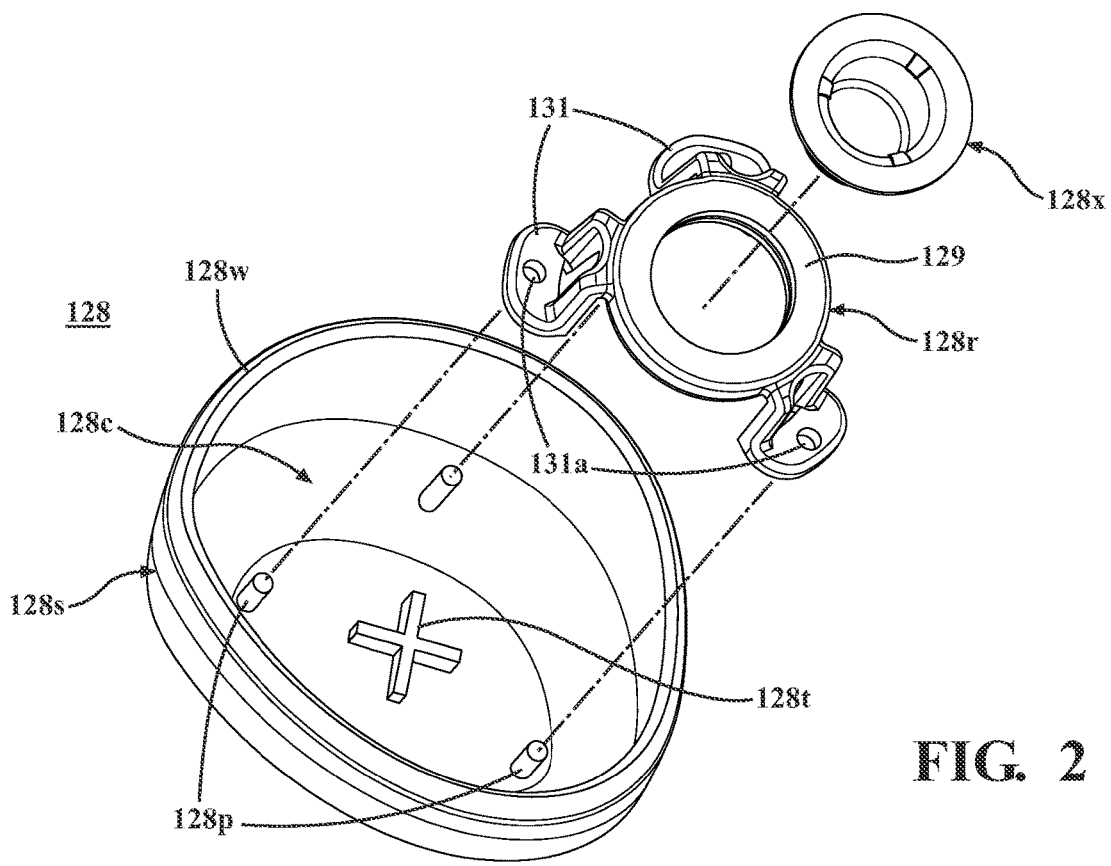
FIG. 2 is a schematic exploded perspective view of an embodiment of a cap structured for application to an end of the steering wheel.
Figure 3A:
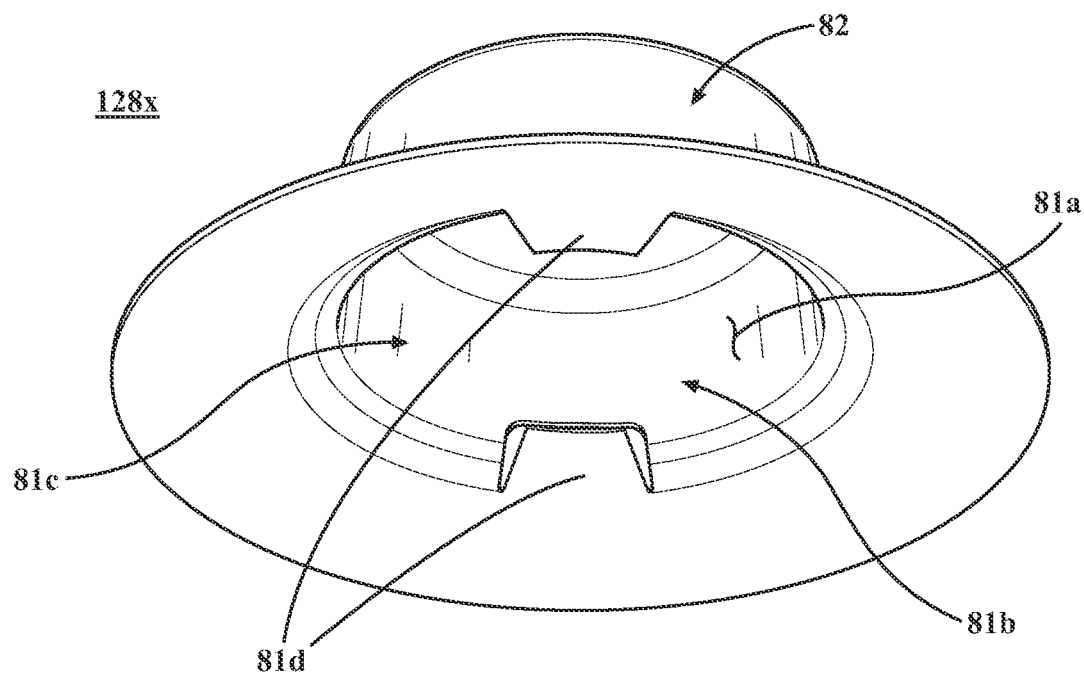
FIG. 3A is a schematic perspective view of an embodiment of a cap securement structure usable in the cap of FIG. 2.
Figure 3B:
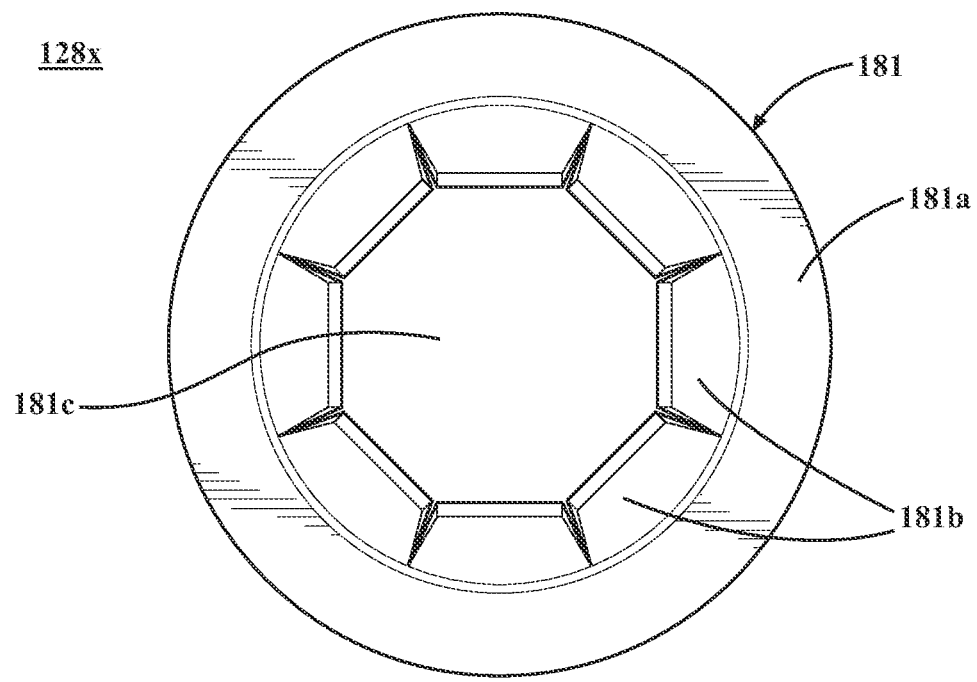
FIG. 3B is a schematic perspective view of another embodiment of a cap securement structure usable in the cap of FIG. 2.
Figure 4:
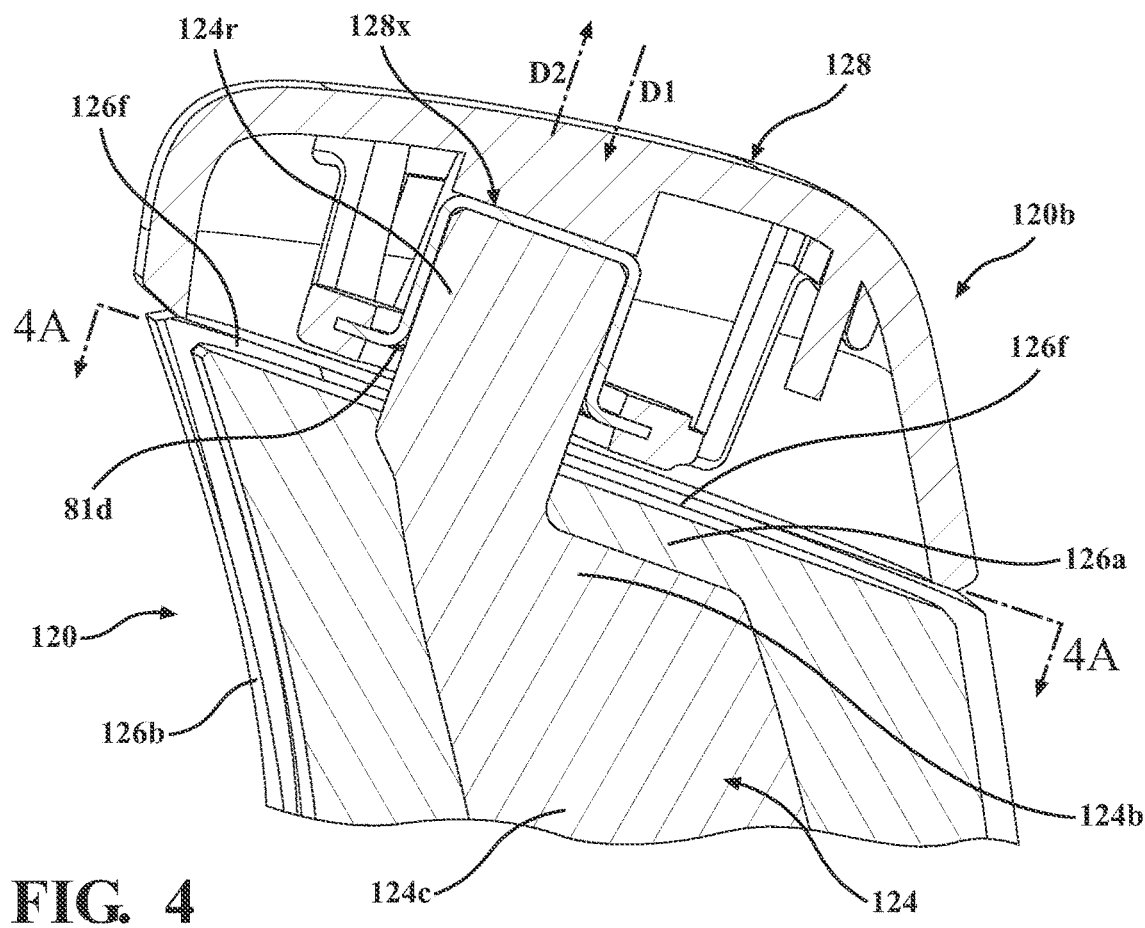
FIG. 4 is a schematic side cross-sectional view of an end of a steering wheel incorporating the cap embodiment shown in FIG. 2 and utilizing the cap securement structure shown in FIG. 3A.
Figure 4A:
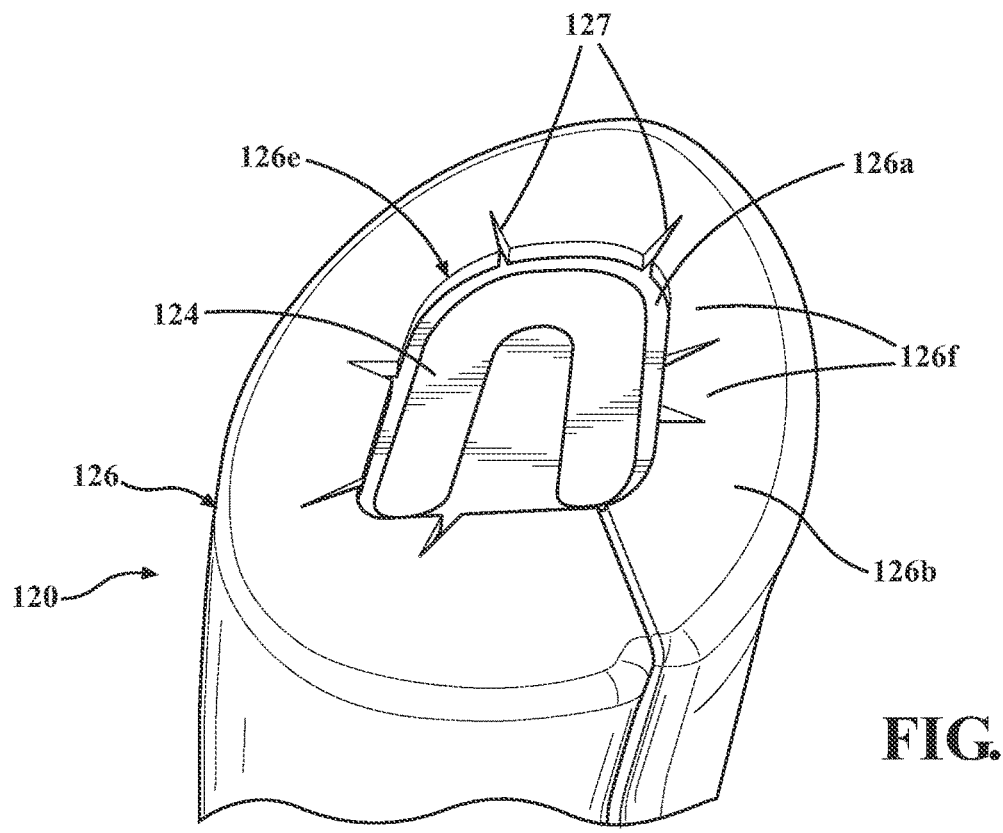
FIG. 4A is a schematic cross-sectional view of a portion of a steering wheel shown in FIG. 4, showing an arrangement of a covering applied to the armature of the steering wheel.

FIGS. 2-4A illustrate a cap 128 and portions of an armature 124 structured of to be attached to a steering wheel 120 in accordance with a particular embodiment described herein. FIG. 2 is a schematic exploded perspective view of an embodiment of the cap 128. FIG. 3A is a schematic perspective view of a cap securement structure in accordance with an embodiment described herein. FIG. 3B is a schematic perspective view of another embodiment of the cap securement structure. FIG. 4 is a schematic side cross-sectional view of an end of a steering wheel incorporating a cap as shown in FIG. 2 and the cap securement structure shown in FIG. 3A. FIG. 4A is a schematic cross-sectional view taken through the steering wheel end shown in FIG. 4, at a location where a cap is shown in its end-use position applied to the steering wheel armature and showing an arrangement of a covering applied to the armature of the steering wheel.

Referring to FIGS. 2-4A, and similar to the embodiment shown in FIG. 1, the steering wheel 120 may have a first end 120a (not shown in FIG. 4) and a second end 120b opposite the first end. In the particular embodiment shown in FIGS. 2-4A, the armature 124 of steering wheel 120 may include a body 124c having a first end 124a (located at steering wheel first end 120a, not shown) and a second end 124b opposite the first end (and located at steering wheel second end 120b). Referring to FIG. 4, a retention post 124r may extend from the armature body 124c at each end of the armature 124.

Attachment of the cap 128 to the armature 124 at the armature second end 124b will be described in detail herein. However, it will be understood that the structures of armature first end 120a and a cap 128 (not shown) applied to the armature first end 120a may be the same as the structures of the armature second end 124b and cap 128 applied to the armature second end.

FIG. 4A shows a typical arrangement of layers of a covering 126 applied over the armature 124. In one or more arrangements, the covering 126 may include a first part 126a applied directly to the armature 124 and a second part 126b applied over at least a portion of the first part 126a. In particular arrangements, the first part 126a may comprise a polymeric overmold applied directly to the armature 124. The overmold 126a may be formed from polyurethane or any other suitable material. In particular arrangements, the covering second part 126b may comprise a wrapping wound around the overmold 126a to cover the overmold. The wrapping 126b may be formed from leather, a rubber compound, or any other material structured to facilitate gripping of the steering wheel 120 by a driver.

In addition, referring to FIG. 4A, a plurality of cut or slits 127 may be formed in an end 126e of the covering second part 126b so that the second part end 126e may be folded over (in overlapping flat sections 126f) onto an associated end of the covering first part 126a. In this configuration, the end 126e of the covering second part 126b may be secured to the covering first part 126a by attachment of the cap 128 to the end of the armature 124 as described in greater detail below.

Embodiments of the cap described herein may include a cap shell having a wall defining an interior cavity. The cap projections(s) used to form the retentive contact interface may be positioned in the interior cavity for contacting the armature. In some arrangements (such as in the embodiment shown in FIGS. 2-4A), the shell wall may be structured to be resist deformation responsive to forces applied to the shell during application of the cap to the armature. In other arrangements, the cap shell wall may be structured to be resiliently deformable responsive to forces applied to the shell during application of the cap to the armature as described herein. "Resilient deformability" as applied to any element of the steering wheel refers to a capability of the element to return to an undeformed (or substantially undeformed) condition of the element after being deformed during steering wheel assembly and upon removal of any forces applied for purposes of steering wheel assembly.

For example, referring to FIGS. 2-4A, cap 128 may include a shell 128s having a wall 128w defining an interior cavity 128c. In the embodiment shown in FIGS. 2-4A, the cap 128 may also include a plurality of staking posts 128p extending from the shell wall 128w into the interior cavity 128c. The cap 128 may also include a standoff or spacer 128t extending from the shell wall 128w into the interior cavity 128c. In addition, the cap 128 may include a cap securement structure (generally designated 128x) incorporating projection(s) for contacting the armature retention post 124r, and a securement structure support 128r attached to the cap securement structure 128x.

The cap securement structure 128x may incorporate one projection or multiple projections. In one or more examples (and as shown in FIGS. 3A and 4), the cap securement structure 128x is in the form of a push-on fastener, such as a push nut 81. As is known in the pertinent art, the push nut 81 may include a generally cylindrical wall 81a defining an opening 81b and a push nut interior 81c, and a pair of opposed projections 81d formed in the wall 81a and extending into the push nut interior 81c. The projections 81d may be in the form of indentations formed in the push nut wall 81a. The projections 81d and/or the wall 81a in which they are formed may be resiliently deformable responsive to forces exerted on the projections during application of the push nut 81 onto the armature post 124r (FIG. 4). The projections 81d may form sharp points or edges inside the push nut interior 81c. These edges may be structured to enable the push nut 81 to slide onto the armature retention post 124*r* in a cap application direction D1 as shown in FIG. 4. The cap attachment direction D1 may be a direction in which the cap 128 is moved with respect to the armature retention post 124*r* to attach the cap 128 to the armature 124 along the post. The projection edges may also be structured to prevent or impede motion of the cap 128 in a cap removal direction D2 opposite the cap application direction D1. In this manner, contact between the projections 81*d* and the armature retention post 124*r* at the retentive contact interfaces helps retain the cap 128 on the armature retention post.

FIG. 3B shows another example of a push-on fastener 181 usable for the purposes described herein. The fastener 181 has an annular body 181*a* with a plurality of cantilevered, resiliently deformable, flaps 181*b* extending radially toward a center opening 181*c* of the fastener. As is known, the flaps 181*b* may be formed at an angle with respect to a plane of the body 181*a*, allowing the fastener 181 to slide onto the armature retention post 124*r* in the cap application direction D1 while resisting motion in the reverse direction D2 as previously described.

Referring to FIG. 2, the securement structure support 128*r* may be secured to the cap securement structure 128*x* to enable mounting of the securement structure 128*x* to the cap shell 128*s*. In one or more arrangements, the securement structure support 128*r* is in the form of an overmold which encapsulates portions of the securement structure 128*x* and provides a mounting structure for the securement structure. In the embodiment shown in FIG. 2, the overmold 128*a* includes a base portion 129 holding the securement structure and a plurality of legs 131 extending from the base portion 129. The legs 131 may be spaced apart so that each leg aligns with a respective one of the staking posts 128*p* extending from the shell wall 128*w*.

To mount the securement structure support 128*r* to the cap shell, each staking post 128*p* may be received in an opening 131*a* formed in a respective one of the legs 131, and the securement structure 128*x* may be positioned so as to abut the spacer 128*t*. The securement structure support 128*r* may then be heat-staked and secured to the shell 128*s* by applying heat to the staking posts 128*p* to thermally deform the staking posts in a known manner. Alternative methods may be used for attaching the securement structure 128*x*/securement structure support 128*r* to the cap shell 128*s*.

In the embodiments described herein, application of the cap to the armature includes positioning the cap to receive the armature retention post in the cap securement structure opening, then moving the cap along the armature retention post in the cap attachment direction D1 so that the cap securement structure projection(s) contact/engage the armature retention post to form an associated retentive contact interface(s), until the cap reaches a designated final or end-use position on the end of the armature. For example, in the embodiment shown in FIGS. 2-4A, as the cap 128 is applied to the retention post 124*r* in direction D1, the projections 81*d* contact the retention post 124*r* and are resiliently deformed radially outwardly to form associated retentive contact interface(s) which retain the cap 128 to the retention post 124*r*. The end-use position of the cap 128 may be a position in which the cap 128 contacts the covering second part 126*b* extending along a surface of the first part 126*a* as shown in FIGS. 4 and 4A.

Also, as seen in FIG. 4, the folded-over sections 126*f* of the covering second part 126*b* may be pressed between portions of the cap 128 and an associated the end of the covering first part 126*a* when the cap 128 is applied to the armature 124. Thus, securement of the cap 128 to the armature 124 also operates to secure the free edges or ends of the covering second part 126*b* to the covering first part 126*a* and on the steering wheel 120.

Figure 6:
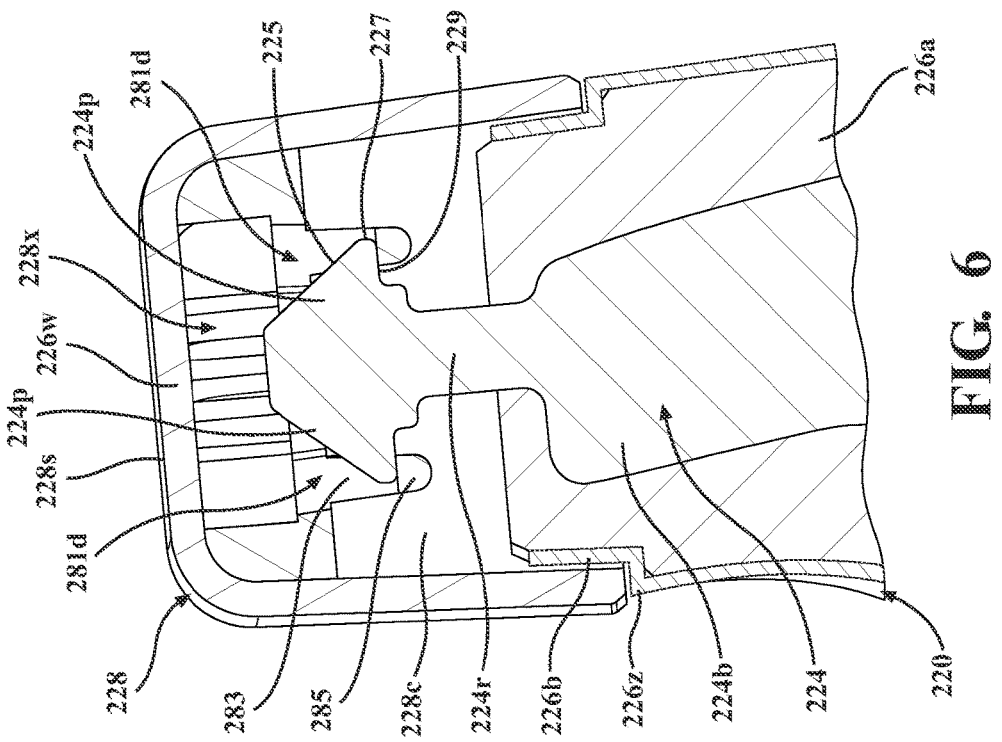
FIG. 6 is a schematic side cross-sectional view of the steering wheel end shown in FIG. 5, shown in an assembled condition.
Figure 5:
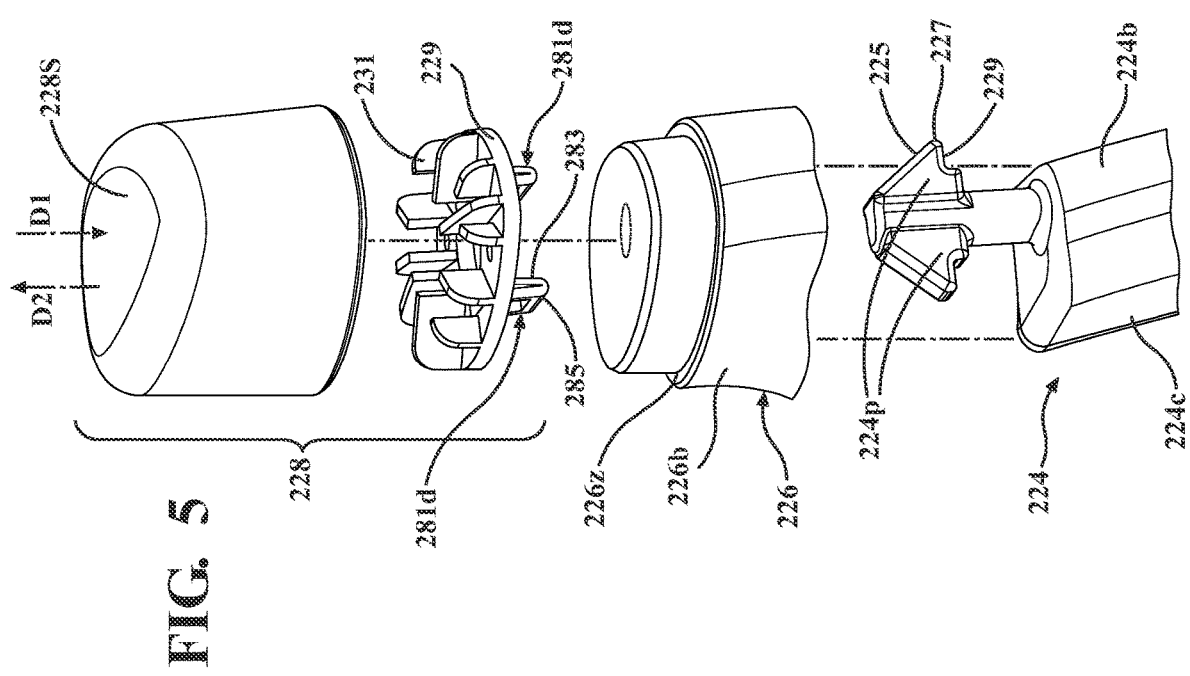
FIG. 5 is a schematic exploded perspective view of an end a steering wheel in accordance with another embodiment described herein, showing application of another embodiment of the cap to an end of another embodiment of the steering wheel armature.

FIGS. 5 and 6 illustrate a cap 228 and portions of an armature 224 structured of to be attached to a steering wheel 220 in accordance with another particular embodiment described herein. FIG. 5 is a schematic exploded perspective view of the cap 228 and a second end 224*b* of an armature 224 of the steering wheel 220. FIG. 6 is a schematic side cross-sectional assembled view of the second end 220*b* of the steering wheel 220 showing the cap 228 in its end-use position applied to the steering wheel armature 224.

Referring to FIGS. 5 and 6, the steering wheel 220 may include an armature 224 similar to the armature previously described with respect to FIGS. 2-4A except as noted herein. In the particular embodiment shown in FIGS. 5 and 6, the armature 224 may include a body 224*c* having a first end (not shown in FIGS. 5 and 6) and second end 224*b*, and a retention post 224*r* extending from the body 224*c* at each end of the armature 224. A pair of retention portions 224*p* may extend from opposite sides of the retention post 224*r*. Each retention portion 224*p* may include a ramp 225 extending from the retention post 224*r* in a direction away from the post and terminating in an end 227 of the ramp. A retention shoulder 229 may extend from the end 227 of the ramp back toward the retention post 224*r*.

Referring to FIGS. 5 and 6, a covering (generally designated 226) may be applied over at least a portion of the armature 224. The covering 226 may have a first part 226*a* and a second part 226*b* applied over the first part 226*a* as previously described with respect to FIGS. 2-4A. In particular arrangements, the covering first part 226*a* may be structured to define a ledge 226*z* at each end of the armature. In addition, each end of the covering second part 226*b* located near an associated end of the armature 224 may be applied over a respective end of the first part 226*a* so as to extend along an associated first part ledge 226*z* prior to application of the cap 228 to the armature 224. Then, when the caps 228 are applied to the armature 224 as described herein, each portion of the covering second part 226*b* extending along an associated ledge 226*z* is pressed between the ledge 226*z* and a portion of an associated cap 228. In this manner, each cap 228 may secure a respective end of the covering second part 226*b* to the covering first part 226*a* along a ledge 226*z* formed in the associated first part end, thereby securing the end of the covering second part 226*b* on the steering wheel 220.

Referring to FIG. 5, the cap 228 may include a shell 228*s* having a wall 228*w* defining an interior cavity 228*c*. The cap 228 may also include a cap securement structure (generally designated 228*x*) incorporating the one or more projection(s) 281*d* structured for contacting the armature retention post 224*r*. The cap securement structure 228*x* may be secured to the shell 228*s* inside the shell interior cavity 228*c*. In some arrangements, the cap securement structure 228*x* may include a base 233 with one or more spacers or standoffs 231 extending from a first side thereof, and a pair of projections 281*d* in the form of opposed, resiliently deformable latching members extending from a second side of the base 233 opposite the first side. Each latching member 281*d* may be structured to latchingly engage an associated one of the armature retention portions 224*p* as described herein to form an associated retentive contact interface therebetween when the cap 228 is applied to the armature 224.

In some arrangements, as shown in FIGS. 5 and 6, each latching member 281*d* may have a pair of opposed arms 283 extending from the base 233 in cantilever fashion, and a bridge 285 connecting the opposed arms 283. The latching members 281d may have alternative structures.

The cap securement structure 228x may be attached to the cap shell 228s inside the interior cavity 228c using any of a variety of suitable methods (e.g., heat staking, vibration welding, etc.)

Referring to FIGS. 5 and 6, during application of the cap 228 to the armature 224, the bridge 285 of each projection/latching member 281d may contact a ramp 225 on an associated armature retention portion 224p as the cap 228 is applied to the armature retention post 224r. Each bridge 285 then slides along its associated ramp 225, causing the latching member 281d to progressively resiliently deform in a direction away from the retention post 224r until the bridge 285 of the latching member 281d reaches the end 227 of the ramp 225 and slides off the ramp. Latching engagement between a latching member 281d and an associated retention portion 224p occurs when the bridge 285 of the latching member 281d slides off the ramp 225 and snaps back toward the retention post 224r, to an undeformed (or substantially undeformed) condition of the latching member 281, bringing the bridge 285 into contact with the retention shoulder 229 of the associated retention portion 224p, thereby forming the retentive contact interface between the latching member 281d and the retention shoulder 229. In this manner, the retentive contact interfaces secure the cap 228 to the armature retention post 224r. Also, because the cap 280 presses the portion of the covering second part 226b between the cap and the ledge 226z against the ledge, securement of the cap 228 to the armature 224 operates to secure the free edges or ends of the second part 226b of the covering 226 to the covering first part 226a.

Figure 7:
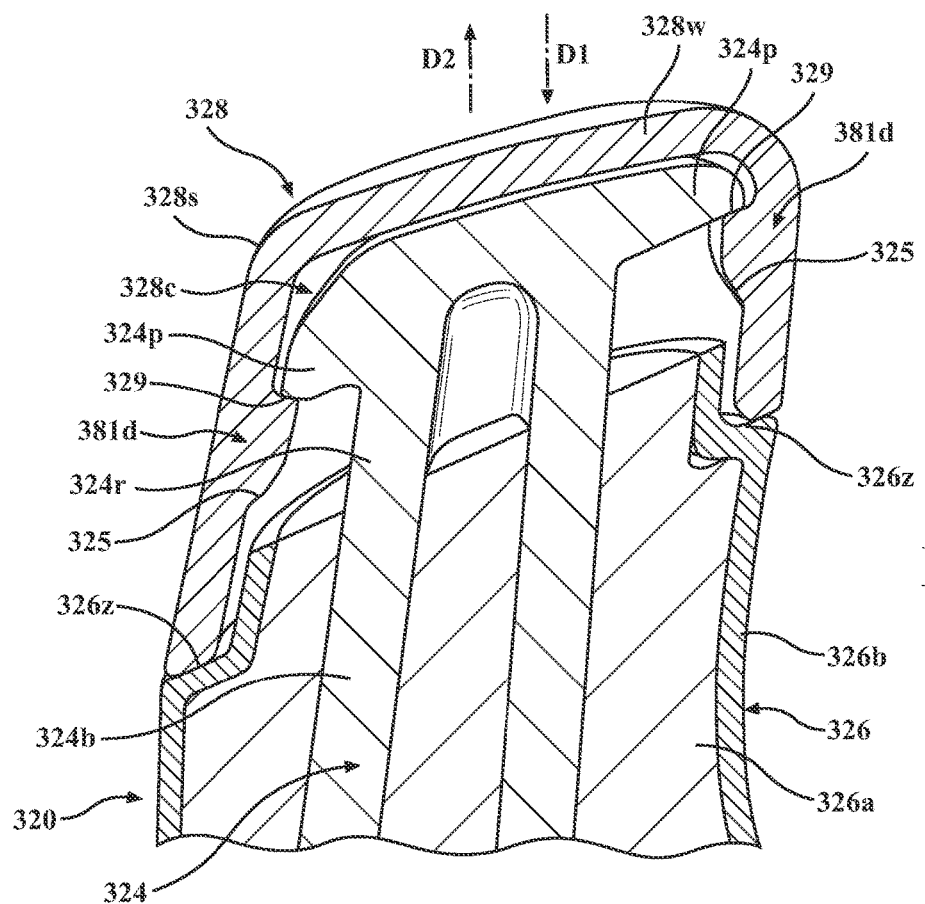
FIG. 7 is a schematic side cross-sectional view of an end a steering wheel in accordance with yet another embodiment described herein, showing application of yet another embodiment of a cap to an end of the steering wheel armature.

FIG. 7 is a schematic cross-sectional view illustrating a cap 328 and portions of an armature 324 structured to be attached to a steering wheel 320 in accordance with another particular embodiment of the steering wheel described herein. Referring to FIG. 7, the steering wheel 320 may include an armature 324 similar to the armature previously described with respect to FIGS. 2-4A except as noted herein. In the particular embodiment shown in FIG. 7, the armature 324 may include a body having a first end (not shown in FIG. 7) and a second end 324b, and a retention post 324r extending from the body 324c at each end of the armature 324. A pair of retention portions 324p may extend from opposite sides of the retention post 324r.

A covering (generally designated 326) may be applied over at least a portion of the armature 324. The covering 326 may be structured as previously described except as noted herein. In particular arrangements, a covering first part 326a may be structured to define a ledge 326z at each end of the armature 324. Each end of the covering second part 326b may be applied over a respective end of the first part 326a so as to extend along an associated first part ledge 326z prior to application of the cap 328 to the armature 324. Then, when the caps 328 are applied to the armature 324 as described herein, each portion of the covering second part 326b extending along a respective ledge 326z is pressed between the ledge 326z and a portion of an associated cap 328. In this manner, each cap 328 may secure a respective end of the covering second part 326b to the covering first part 326a along the ledge 326z formed in the associated first part end, thereby securing the end of the covering second part 326b on the steering wheel 320.

The cap shell 328s may include a resiliently deformable wall 328w defining an interior cavity 328c, and at least one projection 381d extending from the shell wall 328w into the interior cavity 328c. In the embodiment shown in FIG. 7, a pair of projections 381d extends from the shell wall 328w into the interior cavity 328c. In one or more arrangements, the projection(s) 381d are formed as integral portions of the shell 328s (i.e., the shell 328s and the projections 381d extending from the shell wall 328w may be formed as a single piece (e.g., by molding)). Each projection 381d may include a ramp 325 and a cap retention shoulder 329 extending from an end of the ramp 325. Each cap retention shoulder 329 may be structured to lockingly engage an associated armature retention portion 324p as shown in FIG. 7 to form an associated retentive contact interface therebetween when the cap 328 is applied to the armature 324.

Referring to FIG. 7, during application of the cap 328 to the armature 324 in direction D1, each ramp 325 on a cap projection 381d contacts and slides along an associated armature retention portion 324p, causing the shell wall 328w to resiliently deform outwardly until the armature retention portion 324p reaches an end of the ramp 325 and slides off the ramp, forcing the cap retention shoulder 329 into contact with the armature retention portion 324p as the shell wall 328w returns to an undeformed (or substantially undeformed) state. Locking engagement between each cap retention shoulder 329 and the associated armature retention portion 324p occurs when the cap retention shoulder 329 slides into contact with the armature retention portion 324p, thereby forming a retentive contact interface between the cap retention shoulder 329 and the armature retention portion 324p. In this manner, the retentive contact interfaces secure the cap 328 to the armature retention post 324r. Also, because the cap 328 presses the portion of the covering second part 226b between the cap and the ledge 226z against the ledge, securement of the cap 328 to the armature 224 operates to secure the free edges or ends of the second part 326b of the covering 326 to the covering first part 326a.

Figures 8A, 8B:
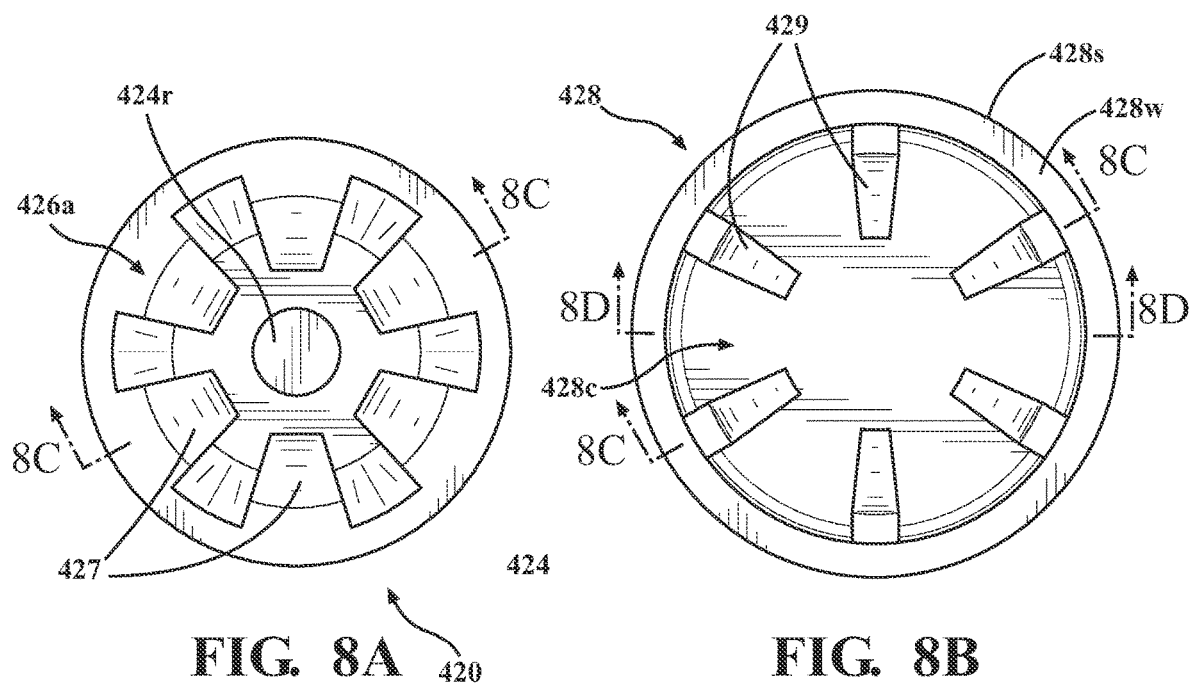
FIG. 8A is a schematic plan view of an end of a steering wheel armature in accordance with a particular embodiment described herein, showing a portion of a covering applied over the armature.
FIG. 8B is a schematic view of a steering wheel cap in accordance with a particular embodiment described herein.
Figure 8C:
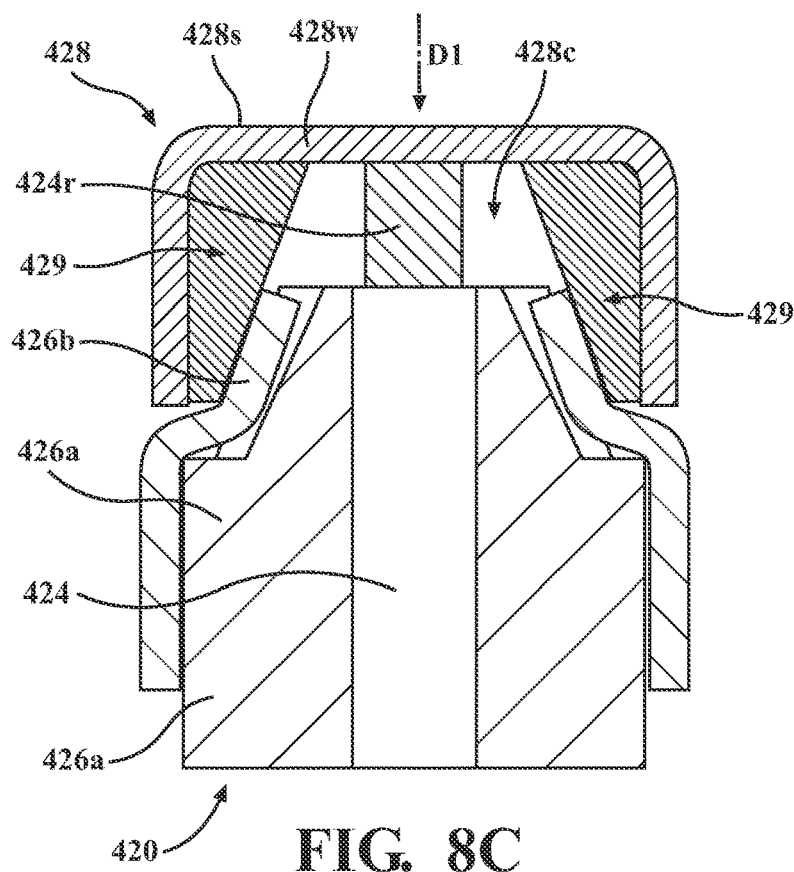
FIG. 8C is a schematic cross-sectional view showing the cap of FIG. 8B applied to the armature of FIG. 8A.
Figure 8D:
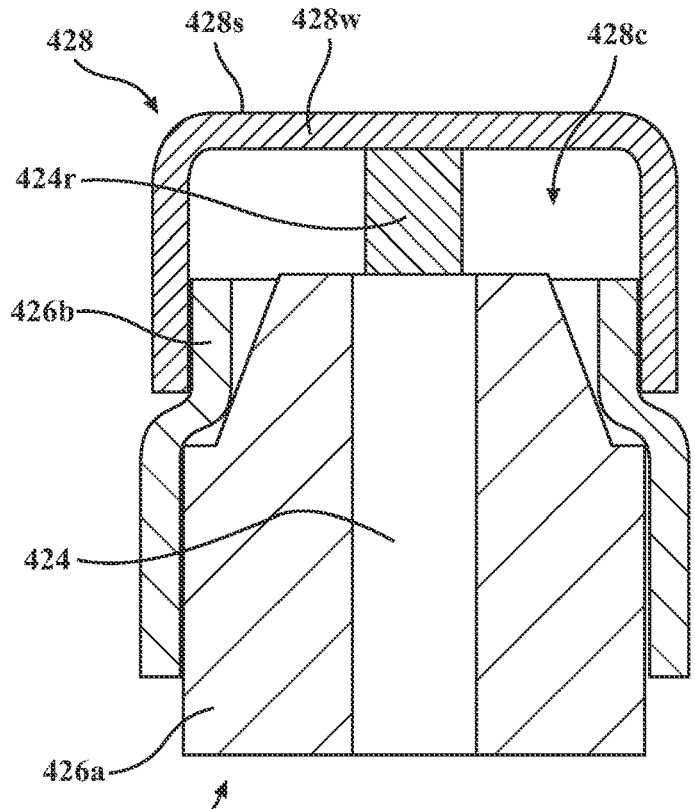
FIG. 8D is a different schematic cross-sectional view showing the cap of FIG. 8B applied to the armature of FIG. 8A.

FIGS. 8A-8D show an alternative structure that may be incorporated into a cap 428 and an armature 424 for securing free ends of a covering second part 426b between a portion of the cap 428 and a portion of a covering first part 426a. FIG. 8A is a schematic plan view of an end of an armature 424 in accordance with particular embodiment described herein. FIG. 8B is a schematic view of a cap 428 looking into an interior cavity 428c of the cap. FIG. 8C is a schematic cross-sectional view of the cap 428 applied to the armature 424, taken through ribs 429 of the cap which press portions of a covering second part 426b into associated cavities 427 formed in a covering first part 426a. FIG. 8D is a schematic cross-sectional view of the cap applied to the armature 424 taken along a plane extending between the ribs 429.

A steering wheel 420 may include an armature 424 having an armature retention post (schematically designated 424r in FIGS. 8A-8D) and a cap 428 including a cap securement structure (not shown) structured to enable the cap 428 to be applied to the armature retention post 424r to engage the armature 424 so as to form a retentive contact interface between the cap 428 and the armature 424, in accordance with any of the arrangements previously described with regard to FIGS. 2-4A, FIGS. 5 and 6, and FIG. 7. In addition, a covering first part 426a may include a plurality of angularly spaced-apart first part cavities 427 formed therealong, In particular arrangements, the cavities 427 may be equiangularly spaced-apart. Also, each cap 428 may include a shell 428s having a wall 428w defining an interior cavity 428c as previously described. The cap 428 may also include a plurality of angularly spaced-apart ribs 429 extending from the shell wall 428w into the interior cavity 428c. The angular spacing of the ribs 429 may match the angular spacing of the covering first part cavities 427, so that each cavity 427 is structured to receive an associated rib 429 therein when the cap 428 is applied to the armature 424.

In addition, as shown in FIG. 8C, each rib 429 may be structured to press a portion of the covering second part 426b into an associated first part cavity 427 when the cap 428 is applied to the armature 424. This structure provides an alternative method of pressing and holding the free ends of the covering second part 426b between the cap 428 and the covering first part 426a, thereby securing the covering second part 426b to the armature 424.

Figure 9A:
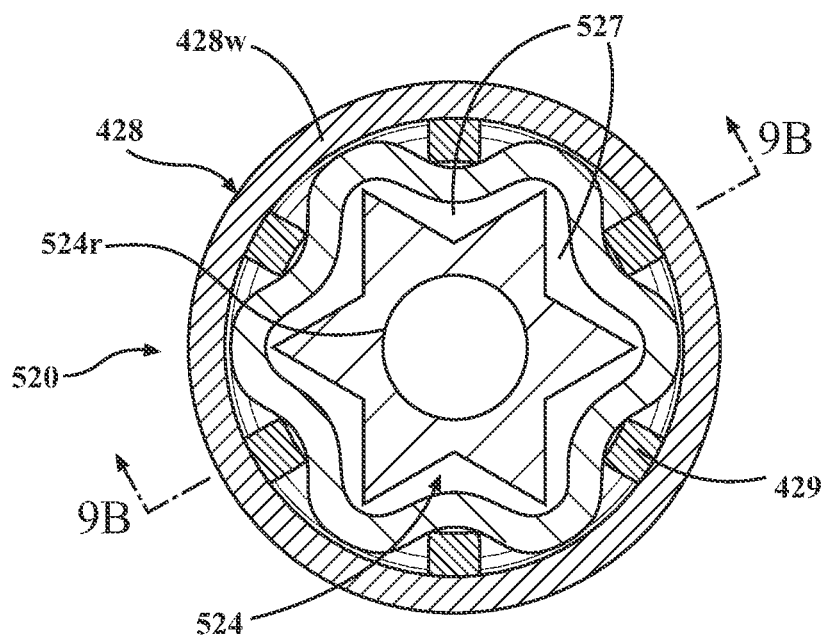
FIG. 9A is a schematic cross-sectional plan view showing the cap of FIG. 8B applied to another embodiment of an armature of a steering wheel.
Figure 9B:
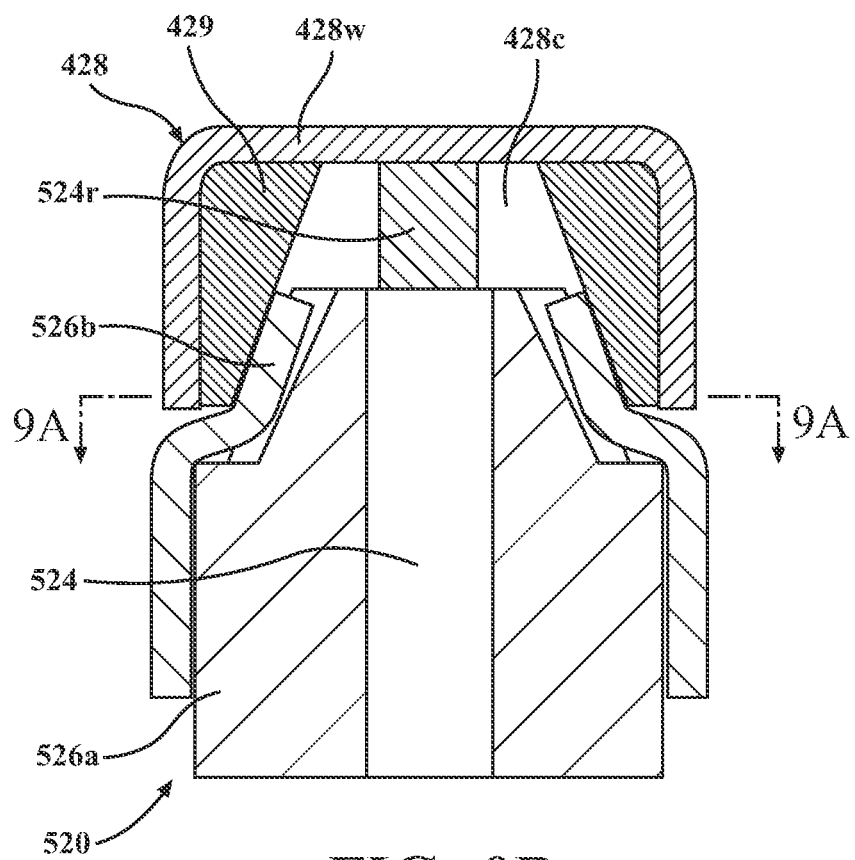
FIG. 9B is a schematic cross-sectional side view of the cap of FIG. 8B applied to the armature shown in FIG. 9A.

FIGS. 9A-9B show another alternative structure that may be incorporated into a cap 428 and an armature 524 for securing free ends of a covering second part 526b between a portion of the cap 428 and a portion of a covering first part 526a. FIG. 9A is a schematic plan cross-sectional view of an end of an armature/cap arrangement as shown in FIG. 9B, in accordance with another particular embodiment described herein. FIG. 9B is a schematic cross-sectional side view of the arrangement shown in FIG. 9A, taken through ribs 429 of the cap 428 which press portions of a covering second part 526b into cavities 527 formed in the covering first part 526a.

A steering wheel 520 may include an armature 524 having an armature retention post (schematically designated 524r in FIGS. 9A-9B) and cap 428 including a cap securement structure (not shown) structured to enable the cap 428 to be applied to the armature retention post 524r to engage the armature 524 so as to form a retentive contact interface between the cap 428 and the armature 524, in accordance with any of the arrangements previously described with regard to FIGS. 2-4A, FIGS. 5 and 6, and FIG. 7. In addition, a covering first part 526a may include a plurality of angularly spaced-apart first part cavities 527 formed therealong, In particular arrangements, the cavities 527 may be equi-angularly spaced-apart. Also, each cap 428 may include a shell 428s having a wall 428w defining an interior cavity 428c as previously described. The cap 428 may also include a plurality of angularly spaced-apart ribs 429 extending from the shell wall 428w into the interior cavity 428c. The angular spacing of the ribs 429 may match the angular spacing of the first part cavities 527, so that each cavity 527 is structured to receive a portion of an associated rib 429 therein when the cap 428 is applied to the armature 524.

In addition, as shown in FIGS. 9A and 9B, each rib 429 may be structured to press a portion of the covering second part 526b into an associated covering first part cavity 527 when the cap 428 is applied to the armature 524. This structure provides an alternative method of pressing and holding the free ends of the covering second part 526b between the cap 428 and the covering first part 526a, thereby securing the covering second part 526b to the armature 524.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A yoke steering wheel comprising:
   an armature including a body terminating in a first end and a second end opposite the first end; and
   a cap structured to be attached to the armature at at least one of the first end and the second end, the cap including at least one projection structured to contact a portion of the armature when the cap is applied to the armature.

2. The steering wheel of claim 1, further comprising a covering applied over at least a portion of the armature, the covering including a first part applied directly to the armature and a second part applied over the first part, wherein a portion of the second part is pressed between a portion of the cap and a portion of the first part when the cap is applied to the armature.

3. The steering wheel of claim 2, wherein the first part defines a ledge, wherein a portion of the covering second part extends along the ledge, and—wherein the portion of the second part extending along the ledge is pressed between the ledge and a portion of the cap when the cap is applied to the armature.

4. The steering wheel of claim 1, further comprising an armature retention post extending from at least one of the first end and the second end and structured to engage the at least one cap projection to attach the at least one cap to the armature.

5. The steering wheel of claim 1, wherein the cap further comprises:
   a cap shell defining an interior cavity;
   a cap securement structure incorporating the at least one projection; and
   a securement structure support attached to the cap securement structure and structured for attaching the cap securement structure to the cap shell within the interior cavity.

6. The steering wheel of claim 5, wherein the cap securement structure comprises a push-on fastener and the at least one projection comprises a feature formed as part of the push-on fastener and structured to resiliently deform during contact with the portion of the armature when the cap is applied to the armature.

7. The steering wheel of claim 1, wherein the armature includes a pair of retention portions, and wherein the cap includes a pair of projections, each projection defining a resiliently deformable latching member structured to latchingly engage an associated one of the retention portions to form an associated retentive contact interface therebetween when the cap is applied to the armature.

8. The steering wheel of claim 1, wherein the armature includes at least one retention portion, wherein the cap includes a resiliently deformable wall defining an interior cavity, the at least one projection extending from the wall into the interior cavity and including a ramp and a cap retention shoulder extending from an end of the ramp, and wherein the cap retention shoulder and the at least one armature retention portion are structured to lockingly engage each other to form an associated retentive contact interface therebetween when the cap is applied to the armature.

9. The steering wheel of claim 8, wherein the ramp contacts and slides along the at least one retention portion during application of the cap to the armature, causing the wall to resiliently deform until the armature retention portion reaches an end of the ramp and slides off the ramp.

10. The steering wheel of claim 1, wherein the cap includes a plurality of projections, each projection being structured to contact the armature when the cap is applied to the armature.

11. The steering wheel of claim 10, wherein the cap includes a shell, and wherein the projections are formed as integral portions of the shell.

12. The steering wheel of claim 1, further comprising a covering applied over at least a portion of the armature, the covering including a first part applied directly to the armature and a second part applied over the first part, wherein a plurality of slits is formed in an end of the second part.

13. The steering wheel of claim 1, further comprising a covering applied over at least a portion of the armature, the covering including a first part applied directly to the armature and a second part applied over the first part, the covering first part including a plurality of first part cavities formed therealong, and wherein the cap includes a shell defining an interior cavity and a plurality of ribs extending into the interior cavity, each rib being structured to press a portion of the covering second part into an associated first part cavity of the plurality of first part cavities when the cap is applied to the armature.

* * * * *